(12) United States Patent
Candy

(10) Patent No.: US 7,474,102 B2
(45) Date of Patent: Jan. 6, 2009

(54) RECTANGULAR-WAVE TRANSMITTING METAL DETECTOR

(75) Inventor: Bruce Halcro Candy, Basket Range (AU)

(73) Assignee: Minelab Electronics Pty Ltd, Torrensville (AU)

( * ) Notice: Subject to any disclaimer, the term of this patent is extended or adjusted under 35 U.S.C. 154(b) by 0 days.

(21) Appl. No.: 11/888,641

(22) Filed: Aug. 1, 2007

(65) Prior Publication Data

US 2008/0048661 A1 Feb. 28, 2008

(30) Foreign Application Priority Data

Aug. 1, 2006 (AU) .............................. 2006904137

(51) Int. Cl.
*G01V 3/08* (2006.01)
(52) U.S. Cl. ........................ 324/326; 324/67; 324/260; 324/228; 324/239
(58) Field of Classification Search ................. 324/326, 324/260, 228, 239, 67
See application file for complete search history.

(56) References Cited

U.S. PATENT DOCUMENTS

| 4,628,265 | A |  | 12/1986 | Johnson et al. |
|---|---|---|---|---|
| 4,868,504 | A |  | 9/1989 | Johnson |
| 5,537,041 | A |  | 7/1996 | Candy |
| 5,576,624 | A |  | 11/1996 | Candy |
| 6,653,838 | B2 | * | 11/2003 | Candy ........................ 324/329 |

* cited by examiner

*Primary Examiner*—Reena Aurora
(74) *Attorney, Agent, or Firm*—Beyer Law Group LLP

(57) ABSTRACT

An electronic metal detector having transmit electronics includes switching electronics arranged and adapted to generate a transmit signal. The transmit electronics includes at least two power sources, and is connected to a transmit coil arranged and adapted to transmit an alternating magnetic field. The switching electronics are adapted and arranged to switch a first voltage of one power source to the transmit coil for at least a first period and also a third period, and to switch a second voltage of the other power source to the transmit coil for at least a second period. Receive electronics are arranged to receive and process a receive magnetic field during at least some of the second period and fourth period to produce an indicator output, at least indicating the presence and a characteristic of some metal targets under the influence of the magnetic field.

9 Claims, 2 Drawing Sheets

RECTANGULAR-WAVE TRANSMITTING METAL DETECTOR

TECHNICAL FIELD

The current invention relates to a electronic metal detector and a method for using the same, where the metal detector transmits a repeating switched rectangular-wave voltage sequence and has particular application to hand-held coin, treasure, prospecting and landmine, coin and treasure detectors.

BACKGROUND ART

In this specification unless the contrary is expressly stated, where a document, act or item of knowledge is referred to or discussed, this reference or discussion is not to be construed as an admission that the document, act or item of knowledge or any combination thereof was at the priority date, publicly available, known to the public, part of common general knowledge; or known to be relevant to an attempt to solve any problem with which this specification is concerned.

Most commercial metal detectors operate in, comprising most handheld metal detectors designed to hunt for buried metal targets such as gold, coins, treasure and archaeological artifacts, means that output signal responds within a relatively short delay to any change in input signal; any delay being typically less than $\frac{1}{10}^{th}$ of a second.

Most metal detectors have a transmitter whose output is connected to a transmit coil for the transmission of alternating magnetic fields, a magnetic field receiving means such as a receive coil which is connected to signal processing and assessment electronics The signal processing and assessment electronics usually comprises a preamplifier whose output is connected to synchronous demodulators whose synchronous demodulation multiplicatior functions are synchronised to the transmitted alternating magnetic fields. The outputs of the synchronous demodulators are connected to low-pass filters cr "demodulation filters" whose outputs are further processed for target identification and indication.

Some commercially available sinusoidal single-frequency transmitting metal detectors have switches that allow a user to select different frequencies. The electronics in such detectors is often relatively expensive. The ability to select different frequencies may be useful, for example, in gold nugget prospecting where the size of gold nuggets may vary from location to location and hence the optimal frequency for detection may also correspondingly vary.

U.S. Pat. No. 5,537,041 discloses a metal detector which transmits multi-period pulses and operates in the time-domain, as too do some commercially available pulse induction metal detectors; see for example U.S. Pat. Nos. 4,868,504 and 5,576,624.

U.S. Pat. No. 4,628,265 discloses a frequency-domain metal detector which applies a voltage square-wave signal to a transmit coil.

It is an object of the present invention to provide a metal detector that overcomes or at least substantially ameliorates the problems associated with the prior art.

Other objects and advantages of the present invention will become apparent from the following description, taken in connection with the accompanying drawings, wherein, by way of illustration and example, an embodiment of the present invention is disclosed.

It is a further object of some aspects of this invention to provide an improved continuous transmit current (cw), low cost metal detector capable of generating at least stronger high frequency components than existing square-wave or rectangular-wave metal detectors.

A yet further object of some aspects of this invention is to provide an improved flexible metal detector platform at relatively low cost, that assists an operator such as a prospector in the location of metal targets, in particular higher sensitivity to faster decay time constant targets.

SUMMARY OF INVENTION

In one form of this invention there is proposed an electronic metal detector having a transmitter, which comprises switching electronics, connected to a transmit coil for the transmission of alternating magnetic fields when operational, a magnetic field receiving means connected to signal processing and assessment electronics, the transmitter being arranged to apply a transmit signal across the transmit coil when operational, the transmit signal comprised of a repeating switched rectangular-wave voltage sequence comprised of at least two substantially constant voltages and alternating rapid switching voltage transitions between the said at least two substantially constant voltages, wherein the said repeating switched rectangular-wave voltage sequence contains at least two different time periods between successive alternating rapid switching voltage transitions, wherein one of the said substantially constant voltages, a second voltage, is at least double the voltage magnitude of another of the substantially constant voltages, a first voltage, the first voltage and second voltage being of opposite sign, the switching electronics being adapted to alternately switch between the first voltage and the second voltage, the first voltage supplied by a power supply connected to a substantially constant power source, and the second voltage being provided by a storage capacitor connected so that it will be charged by a back-emf of the transmit coil and adapted to be switched to the storage capacitor by the switching electronics.

In a further form, the invention may be said to reside in an electronic metal detector having transmit electronics comprising switching electronics arranged and adapted to generate a transmit signal, the transmit electronics comprising at least two power sources, a first power source and a second power source, the transmit electronics being connected to a transmit coil arranged and adapted to transmit an alternating magnetic field, wherein the switching electronics are adapted and arranged to switch a first voltage of the first power source to the transmit coil for at least a first period and also a third period, the switching electronics being adapted and arranged to switch a second voltage of the second power source to the transmit coil for at least a second period, the switching electronics being adapted and arranged to switch approximately zero volts to the transmit coil for at least a fourth period, the second voltage being opposite in polarity to the first voltage, and an absolute magnitude of the first voltage being at least ten times an absolute magnitude of the second voltage, the said first voltage, second voltage, first period, second period and third period and fourth period being selected so that a transmit coil current increases in a second polarity sense during the second period and changes sign during the second period, and the transmit coil current increases in an opposite polarity sense to the second polarity sense during the first period and also the third period, receive electronics is adapted and arranged to receive and process a receive magnetic field during at least some of the second period and fourth period to produce an indicator output, the indicator output at least indicating the presence of at least some metal targets under the influence of the said alternating magnetic field and indicating at least a characteristic of the said metal targets.

In a further form, the invention may be said to reside in a method of metal detection with an electronic metal detector having a transmitter, which includes switching electronics, connected to a transmit coil for the transmission of alternating magnetic fields when operational, a magnetic field receiving means connected to signal processing and assessment electronics, the transmitter applying a transmit signal across the said transmit coil, the transmit signal being comprised of a repeating switched rectangular-wave voltage sequence comprised of at least two substantially constant voltages and alternating rapid switching voltage transitions between the said at least two substantially constant voltages, wherein the repeating switched rectangular-wave voltage sequence contains at least two different time periods between successive alternating rapid switching voltage transitions, wherein one of the said substantially constant voltages, a second voltage, is at least double the voltage magnitude of another of the substantially constant voltages, a first voltage, the first voltage and second voltage being of opposite sign, the said switching electronics alternately switching between the first voltage and the second voltage, the first voltage being supplied by a power supply connected to a substantially constant power source, and the second voltage being provided by a storage capacitor connected so that it is being charged by a back-emf of the transmit coil, which is switched to the storage capacitor by the switching electronics.

In yet a further form, the invention may be said to reside in an electronic metal detector having a transmitter, which includes switching electronics, connected to a transmit coil for the transmission of alternating magnetic fields when operational, a magnetic field receiving means connected to signal processing and assessment electronics, the transmitter being arranged to apply a transmit signal across the transmit coil when operational, the transmit signal comprised of a repeating switched rectangular-wave voltage sequence comprised of at least two substantially constant voltages and alternating rapid switching voltage transitions between the said at least two substantially constant voltages, wherein the repeating switched rectangular-wave voltage sequence contains at least two different time periods between successive alternating rapid switching voltage transitions, wherein one of the said substantially constant voltages, a second voltage, is at least double a voltage magnitude of the other of the substantially constant voltages, a first voltage, the first voltage and second voltage being of opposite sign, the switching electronics being adapted to alternately switch between the first voltage and the second voltage, the first voltage supplied by a power supply connected to a substantially constant power source, and the second voltage is provided by a storage capacitor connected so that it will be charged by a back-emf of the transmit coil and adapted to be switched to the storage capacitor by the switching electronics.

Pulse induction (PI) metal detectors have advantage in producing a wide-band transmission well suited to the detection of both slow and fast time constant targets. The problem with this art is that the power efficiency is poor. In this invention a similar PI waveform is disclosed with power efficiency improvement: The transmit coil is switched between at least two voltages of opposite polarity, one significantly higher than the other such that the switching electronics is power efficient and energy in the transmit magnetic field is mostly conserved. This too will yield a wide-band transmission spectrum and the power efficiency will be improved compared to PI.

Also, in a standard PI system, the transmit current is unipolar and thus the square of the peak current equals the square of the peak current change; the peak current change being representative of an expected receive signal strength. In this new proposed PI-like waveform transmitting metal detector, the peak transmit coil positive current typically will equal in magnitude the peak transmit coil negative current. For a given waveform the power dissipated in the transmit coil equals some constant multiplied by the square of the transmit coil peak current, and thus for a given power dissipated in the transmit coil the signal may be expected to be bigger from the proposed new PI-like transmit signal than conventional PI.

Thus the new proposed PI-like waveform offers advantage of producing a wide-band transmission well suited to the detection of both slow and fast time constant targets at high efficiency.

BRIEF DESCRIPTION OF THE DRAWINGS

The detailed aspects and exemplification of the invention are now explained with reference to a preferred embodiment where.

DETAILED DESCRIPTION OF THE INVENTION

Figure 1:
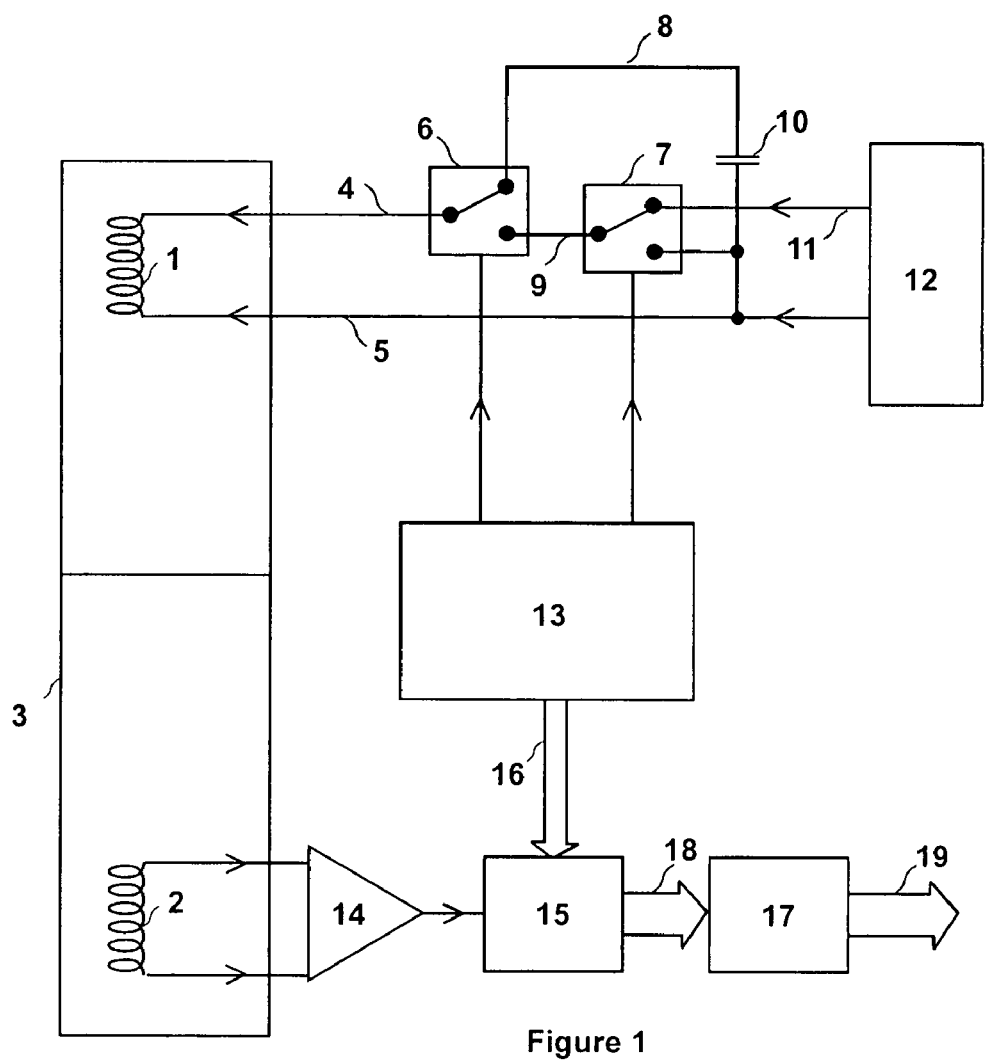
FIG. 1 is a block electronic circuit diagram of an embodiment.

Referring now to FIG. 1, where there is illustrated an electronic metal detector having transmit electronics (4, 5, 6, 7, 8, 9, 10, 11, 12 and 13), which includes switching electronics consisting of switch 6 and switch 7, both controlled by timing electronics 13. When operational, a transmit signal appears across output 4 and output 5, which is connected to a transmit coil 1, which transmits a resulting alternating magnetic field. A second power source 12 supplies a second voltage output at 11 and 5, and a first power source consists of a capacitor 10, whose energy is provided by a back-emf of the transmit coil switched to the storage capacitor by the said switching electronics, the charge within the storage capacitor being increased and decreased as energy is transferred back and forth between the said storage capacitor and the transmit coil, which results in a first voltage appearing across capacitor 10. When switch 6 selects output 8, that is capacitor 10, the first voltage appears across the transmit coil, when switch 6 selects 9, that is switch 7 and switch 7 selects output 11, the second voltage appears across the transmit coil, and when switch 6 selects switch 7 and switch 7 selects output 5, approximately zero volts appears across the transmit coil (except for a voltage drop owing to transmit coil current flowing through the resistive components of the switches and associated tracks).

The receive electronics (13, 14, 15, 16, 17, 18, 19) are adapted and arranged to receive and process a signal from receive coil 2 which receives a receive magnetic field. Receive coil 2 is connected to preamplifier 14. An output of preamplifier 14 is connected to synchronous demodulators 15 which are controlled by timing electronics 13 via control lines 16. Outputs 18 of the synchronous demodulators 15 are fed to further processing electronics 17 which low-pass filters the outputs 18 and signals at the outputs of these low-pass filters are further processed to produce indicator outputs 19, where the indicator outputs 19 at least indicate the presence of at least some metal targets under the influence of the said alternating magnetic field and indicate at least a characteristic of the said metal targets, such as at least the ferrous nature of the said metal targets. The transmit coil 1 and receive coil 2 are usually housed within the same coil housing 3.

Figure 2:
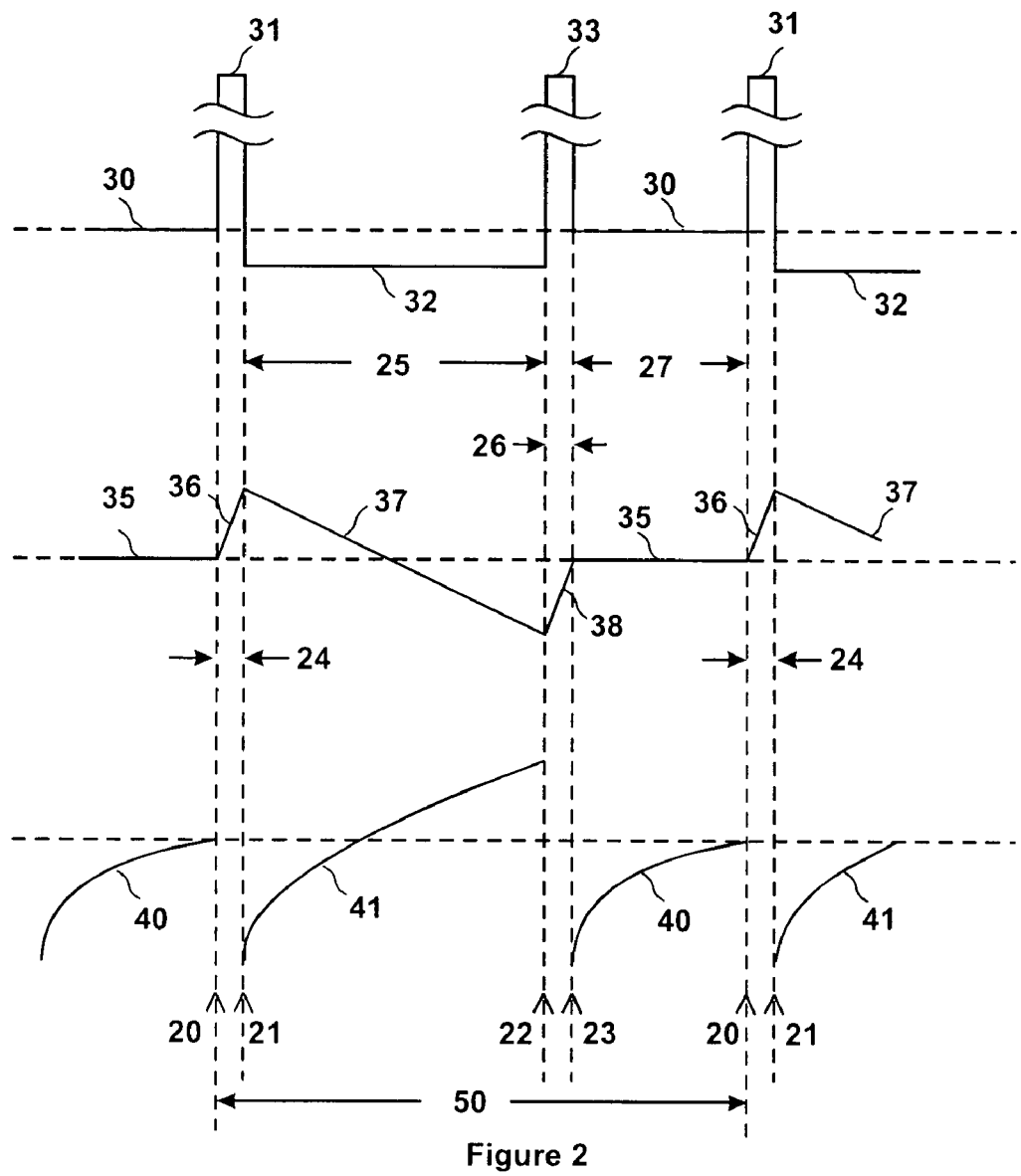
FIG. 2 illustrates an example of transmit signal and receive signal waveforms used by the circuit illustrated in FIG. 1.

FIG. 2 shows an example of a transmit signal repeating sequence consisting of repeating a fundamental periods. The first period commences at time 20 and terminates at 21, that is period 24. The second period commences at time 21 and terminates at 22, that is period 25. The third period commences at time 22 and terminates at 23, that is period 26. The fourth period commences at time 23 and terminates at 20, that is period 27. The repeating fundamental period 50 consists of the first period, followed by a second period, followed by a third period, followed by a fourth period. The transmit signal voltage applied across the transmit coil during the first period 24 is the first voltage 31, during the second period 25 is the second voltage 32, during the third period 26 is the first voltage 33, and during the fourth period 27 is zero voltage 30, and then the sequence repeats. The first voltage waveforms during the first and third periods are reduced in scale in FIG. 2 for convenience. The second voltage (shown in FIG. 2 as negative) is opposite in polarity to the first voltage (shown in FIG. 2 as positive), and an absolute magnitude of the first voltage is at least ten times an absolute magnitude of the second voltage.

During the first period 24 the transmit coil current 36 is initially near zero and increases positively. During the second period 25 the transmit coil current 37 is initially at a positive peak value and decreases through zero to a negative peak value. The shape of the transmit current waveform 37 during the second period 25 is nearly linear but in fact an exponential function $I=I_p+V/Re^{-(t/T)}$ where $T=L/R$ is the transmit coil circuit time constant where L is the total effective inductive component and R the total effective series resistive component including the resistance of the electronics, cabling, any connectors and transmit coil. Ip is the initial positive peak current and V is the second voltage, which is negative in sign. The transmit coil current during all the periods is also an exponential function, but owing to the voltages and periods involved, is near linear. During the third period 26 the transmit coil current 38 is initially the negative peak, then increases positively to near zero. During the fourth period 24 the transmit coil current 30 is near zero and a maximum absolute value of the transmit coil current during the first or second or third period exceeds by a factor of more than three a maximum absolute value of the transmit coil current during the fourth period. In this example the duration of the first period 24 and third period 36 are the same.

The more useful practical voltages for coin, nugget are land-mine location are if the absolute magnitude of the first voltage is more than 100 volts and less than 400 volts, and the absolute magnitude of the second voltage is more than 2 volts and less than 20 volts, and the fundamental period between about 1 mS and 0.05 mS.

Ferrous metal target signals usually have a distributed "time constant" profile, that is a continuum from short to long "time constants," as described in U.S. Pat. No. 41,491. At the end of the fourth period, the eddy currents in metal targets are relatively low in magnitude. During the first period the pulse induction-like short duration high voltage transmit coil voltage signal excites a relatively broad frequency spectrum of eddy current components in a ferrous target. These decay during the second period and the long duration of the second voltage during the second period excites mostly low frequency eddy currents in an opposite polarity sense to the excitation of eddy currents during the first period. The net result produces a decaying voltage signal 41 across the receive coil 2. The short "time constant" eddy current components decay away quickly and thus are manifest at the commencement of the second period, the medium "time constant" eddy current components persist for longer, and the long "time constant" eddy current components persist of until the end of the second period. Also manifest is the ferrous magnetic ("X") component of the ferrous metal target which is opposite in sign to the net eddy current diamagnetic contribution. Thus near the end of the second period the receive voltage may change sign provided the second period is of long enough duration for the X component to exceed the long "time constant" net diamagnetic eddy currents contribution. FIG. 2 shows this change in sign. During the third period the pulse induction-like short duration high voltage transmit signal excites a relatively broad frequency spectrum of eddy current components in a ferrous target just as the first period did. At the end of the second period, long "time constant" eddy current components are still significant as shown by the still decaying signal 41. The polarity sense of eddy current excitation during the third period is opposite to the second period. Thus the long "time constant" eddy current contribution is attenuated during the fourth period but the short (and medium) "time constant" eddy current contribution during the fourth period is the same as that during the second period. Thus the receive waveform 40 during the fourth period shows attenuated long "time constant" components and thus a faster decay to near zero at the termination of the fourth period. As the transmit voltage is approximately zero during the fourth period, no "X" ferrous component is present during the fourth period. Thus the X component of a metal target is most accurately assessed by synchronously demodulating the receive signal near the end of the second period and also fourth period (at least the second halves of each) to maintain balanced demodulation (to suppress static magnetic fields and low frequency electronics noise). Thus this system is well suited to extracting the ferrous nature of a target. This is the most important target characteristic identification to assess and discriminate against when searching for non-ferrous targets as there is typically very much more ferrous metal "junk" compared to non-ferrous metal targets.

In order to measure the conductivity of a metal target most accurately, the measured component should be free of the relatively large soil magnetic X component, that is the processed conductivity ("R") components should be at least approximately "ground balanced" to the soil X component. The differential eddy current induced voltage signal in the receive coil is the loss "R" contribution. This may be measured by synchronously demodulating a positive contribution during the second period 25 and subtracting a later synchronously demodulated contribution such that the purely magnetic X is nulled. To achieve this and extract fast time constant R components but attenuated medium and long time constant R components, shortly after the commencement of the second and fourth periods, a short duration "positive" synchronous demodulation period should be added to another short duration "negative" synchronous demodulation period following shortly after the "positive" periods. Because of the exponential transmit coil current function during the second period (decreasing reactive voltage), the "negative" integrated synchronous demodulation multiplication factor during the second period need be larger than the positive contribution so as to ensure "X" ground balance. This needs to be offset by a compensating lesser "negative" synchronous demodulation during the fourth period to maintain balanced synchronous demodulation.

Similarly to extract medium time constant components but attenuate short and long time constant components, shortly after the short time constant component synchronous demodulation periods, or maybe with a bit of overlap, a medium duration "positive" synchronous demodulation period should be added to another medium duration "negative" synchronous demodulation period following shortly after the medium duration "positive" periods. Again, because of the exponential transmit coil current function during the second period the "negative" integrated synchronous demodulation multiplication factor during the second period need be larger than the positive contribution so as to ensure "X" ground balance. This needs to be offset by a compensating lesser "negative" synchronous demodulation during the fourth period to maintain balanced synchronous demodulation.

Similarly to extract long time constant components, the synchronous demodulation periods need to occur and extend yet later than the medium component periods and it is best if these extend up to the termination of the second and fourth periods. Most of the long time constant component needs to be gleaned from the second period, the fourth mostly be used for the purposes of X balancing.

Ratios of these time constant components will indicate the conductivity of metal targets.

To compare the power dissipated in the transmit coil for a simple PI system compared to the system employing the waveforms in FIG. 2, assume the fourth period in the new system (described above) is half the duration of the second period, the first period and third period are of negligible duration, the reactive transmit voltage is approximately the voltage applied to the transmit coil, the compared PI system has the second voltage applied to the transmit coil for half the fundamental period, followed by a very short duration back-emf, and then a receive signal period for the remainder of the fundamental period, any voltage drops across diodes etc in the PI system are negligible, and all the energy in the back-emf period delivered to a storage capacitor in the PI system (via a diode) is returned to the second power supply via a highly efficient power supply as described in U.S. Pt. No. 6,686,742.

As there are 2 back emf periods in the new system, the high frequency voltage spectrum has sqrt(81/48)* 4/3=1.7 the sensitivity of the PI system for the same power consumption in the transmit coil. However, when the voltage drop across diodes etc in the PI system and other inefficiencies of the system described in U.S. Pat. No. 6,686,742 are taken into account, this figure will be significantly improved yet further for the total transmit circuit power consumption being equal in both systems.

For simplicity of comparison, a system without the fourth period and with the first and third periods combined, that is the fundamental period is approximately the second period, has approximately the same response as a single frequency sine-wave transmitting system of the same fundamental period using an extremely efficient class-D amplifier, with the same power loss in the coil. Both respond asymptotically as $1/\tau$ to long time constant targets, whereas the PI system described above as $1/\tau^2$, where $\tau$ is the target time constant (=I/r for first order targets where I is the effective eddy current path inductance and r the effective resistance). Thus PI is less sensitive to long time constant targets compared to most cw systems.

A system with the fourth period equal to zero and the first and third periods combined, is also useful but a preamplifier within the receive electronics needs to include high-pass filtering, so that the static environmental magnetic fields and low frequency noise is sufficiently attenuated in any unbalanced synchronously demodulated output, for example the X channel. For such a system, synchronous demodulation occurs during the second period for both loss R and reactive components X.

Assuming that demodulation commences after a period for the soil fast decaying eddy currents conductive components to have reduced to near zero, this new time domain system will have substantially better attenuation to these soil components compared to a multi-frequency sine-wave frequency domain system as described in U.S. Pat. No. 4,942,360 because of the exponential attenuation of these fast decaying components before demodulation commences in a time domain system, whereas the multi-frequency sine-wave frequency domain system responds asymptotically as $\tau^2$ to very short time constant targets assuming that the processing is set to cancel these components as described in U.S. Pat. No. 4,942,360. For these soil fast decaying conductive components, $\tau$ is in fact a continuum distribution where the value $\tau$ should be seen as the median "time constant" value. Thus this new art has advantage over PI systems, multi-frequency sine-wave systems and also the multi-period rectangular systems such as disclosed in U.S. Pat. No. 63,184.

The electronics may be adapted and arranged so that either the waveform shown in FIG. 2 may be selected by an operator or a different waveform such as for example, one with the fourth period equal to zero and the first and third periods combined as described above, or yet other transmit signal waveforms, the usefulness of different waveforms depending on application. These selections may be achieved via switches connected to the timing electronics. Further, a different fundamental period of a repeating sequence may be selected by an operator, a useful change being equal to or more than a factor of 2, again depending on application. For example, shorter fundamental periods are more useful for the detection of shorter time constant targets and for lower power consumption for a given transmit waveform and voltages.

WO2005/047932 and provisional patent AU2006904137 disclose advantages in maintaining a transmit coil constant reactive voltage. The waveform described in FIG. 2, especially with the transmit coil current during the fourth period equal to zero and with the transmit coil reactive voltage being constant during the second period, would be likewise useful in the detection of gold or landmines in highly mineralised soils. So too would the waveform with the fourth period equal to zero duration and the first and third periods combined, and the transmit coil reactive voltage being constant during the second period, be useful for gold or land-mine detection. Although the invention has been herein shown and described in what is conceived to be the most practical and preferred embodiment, it is recognised that departures can be made within the scope of the invention, which is not to be limited to the details described herein but is to be accorded the full scope of the appended claims so as to embrace any and all equivalent devices and apparatus.

The invention claimed is:

1. An electronic metal detector comprising transmit electronics comprising switching electronics arranged and adapted to generate a transmit signal, the transmit electronics comprising at least two power sources, a first power source and a second power source, the transmit electronics being connected to a transmit coil arranged and adapted to transmit an alternating magnetic field, wherein the switching electronics are adapted and arranged to switch a first voltage of the first power source to the transmit coil for at least a first period and also a third period, the switching electronics being adapted and arranged to switch a second voltage of the second power source to the transmit coil for at least a second period, the switching electronics being adapted and arranged to switch approximately zero volts to the transmit coil for at least a fourth period, the second voltage being opposite in polarity to the first voltage, and an absolute magnitude of the first voltage being at least ten times an absolute magnitude of the second voltage, the first voltage, second voltage, first period, second period, third period and fourth period being selected so that a transmit coil current increases in a second polarity sense during the second period and changes sign during the second period, and the transmit coil current increases in an opposite polarity sense to the second polarity sense during the first period and also the third period, receive electronics is adapted and arranged to receive and process a receive magnetic field during at least some of the second period and fourth period to produce an indicator output, the indicator output at least indicating the presence of at least some metal targets under the influence of the said alternating magnetic field and indicating at least a characteristic of the said metal targets.

2. The electronic metal detector as in claim 1, further characterised in that the second power source is a storage capacitor, the transmit electronics comprising switching electronics being arranged and adapted to provide energy to the storage capacitor from energy of the back-emf of the transmit coil switched to the storage capacitor by the switching electronics, the charge within the storage capacitor being increased and decreased as energy is transferred back and forth between the storage capacitor and the transmit coil.

3. The electronic metal detector as in claim 1, further characterised in that transmit electronics comprising switching electronics is arranged and adapted such that a maximum absolute value of the transmit coil current during the first or second or third period exceeds by a factor of more than three a maximum absolute value of the transmit coil current during the fourth period.

4. The electronic metal detector as in claim 1, further characterised in that the transmit electronics comprising switching electronics is arranged and adapted such that the transmit signal forms a repeating sequence consisting of repeating fundamental periods each consisting of the first period, followed by the second period, followed by the third period, followed by the fourth period.

5. The electronic metal detector as in claim 4, further characterised in that the transmit electronics comprising switching electronics is arranged and adapted such that an operator may alter a transmit signal waveform which may include a change in the waveform and or a change in the fundamental period of the repeating sequence by equal to or more than a factor of 2.

6. The electronic metal detector as in claim 5, further characterised in that the receive electronics are adapted and arranged to receive and process a receive magnetic field during the second half of the second period and during the second half the fourth period to produce an indicator output at least indicative of a ferrous nature of at least some metal targets under the influence of the alternating magnetic field.

7. The electronic metal detector as in claim 6, further characterised in that the transmit electronics comprising switching electronics is arranged and adapted such that an absolute magnitude of the first voltage is more than 100 volts and less than 400 volts, and the absolute magnitude of the second voltage is more than 2 volts and less than 20 volts.

8. The electronic metal detector as in claim 7, wherein the transmit electronics comprising switching electronics is arranged and adapted such that, the fourth period is of zero duration and the first and third periods combined, and the receive electronics comprises a preamplifier with high-pass filtering, the receive electronics being adapted and arranged to receive and process a receive magnetic field during at least some of the second period to produce an indicator output, the indicator output at least indicating the presence of at least some metal targets under the influence of the alternating magnetic field and indicating at least a characteristic of the metal targets.

9. The electronic metal detector as in claim 6, further characterised in that the second power source is adapted and arranged such that the second voltage increases in absolute magnitude at least during the second period such that the transmit coil reactive voltage is held approximately constant.

* * * * *